United States Patent [19]
Koch

[11] 3,777,833
[45] Dec. 11, 1973

[54] STEERING MECHANISM FOR HYDROSTATICALLY DRIVEN AGRICULTURE MACHINES

[75] Inventor: Karl E. Koch, Mohnton, Pa.

[73] Assignee: Sperry Rand Corporation, New Holland, Pa.

[22] Filed: July 15, 1971

[21] Appl. No.: 162,886

[52] U.S. Cl. ............... 180/6.48, 74/491, 180/77 H
[51] Int. Cl. ............................................. B62d 11/04
[58] Field of Search .............. 180/6.24, 6.26, 6.3, 180/6.32, 6.48, 77 H, 77 HT; 280/87 A; 74/480, 491

[56] References Cited
UNITED STATES PATENTS

| | | | |
|---|---|---|---|
| 3,526,153 | 9/1970 | Howell et al. | 180/6.48 X |
| 3,198,030 | 8/1965 | Miller et al. | 280/87 A X |
| 3,181,389 | 5/1965 | Richard | 74/480 |
| 2,818,126 | 12/1957 | Vogelaar | 180/6.48 |
| 3,431,993 | 3/1969 | Case | 180/6.48 |
| 3,459,273 | 8/1969 | Leinhauser et al. | 180/6.48 |
| 3,581,497 | 6/1971 | Krumholz | 180/6.48 X |
| 3,596,732 | 8/1971 | Glass et al. | 180/6.48 |
| 3,599,741 | 8/1971 | Langford | 180/6.48 |

Primary Examiner—Kenneth H. Betts
Assistant Examiner—Leslie J. Paperner
Attorney—Joseph A. Brown and James J. Kennedy

[57] ABSTRACT

A self-propelled windrower is driven through two hydrostatic units coupled respectively to the front drive wheels and is controlled in direction by a steering wheel connected to the hydrostatic units by a steering mechanism provide a substantial movement of the steering wheel for a change in the hydrostatic units.

8 Claims, 11 Drawing Figures

INVENTOR.
EARL E. KOCH
BY George C. Bower
ATTORNEY

STEERING MECHANISM FOR HYDROSTATICALLY DRIVEN AGRICULTURE MACHINES

This invention relates to steering mechanisms for self-propelled, hydrostatically driven agriculture machines such as windrowers and the like.

BACKGROUND OF THE INVENTION

The usual conventional self-propelled windrower comprises a tractor and a header partially suspended on the front of a tractor. The tractor has two large spaced front wheels driven mechanically or hydrostatically. In the case of hydrostatically driven machines, each of the front wheels are driven through separate hydraulic pump and motor units. The pumps are connected to the tractor engine and hydraulically driven to the motors, respectively, coupled to the respective wheels. The direction of travel is controlled by driving the respective wheels at different speeds causing the tractor to turn about the slower wheel. The speed of the wheels is controlled by varying the hydraulic output of the pumps through pintle arms. As explained in the copending application Ser. No. 816,001 filed Apr. 14, 1969 and entitled "Speed and Directional Control Mechanism for a Tractor Having Two Separately Driven Front Wheels" the hydraulic pumps may be adjusted by the operator through separate control levers or adjusted by a single lever. The single lever moves in a fore-and-aft plane to control the speed of the tractor and rotates about a generally vertical axis in the plane to create a differential between the outputs of the pumps for turning the tractor. This mechanism has handle bars on the upper end of the lever for controlling the speed and direction of the windrower.

Although this satisfactorily steers and controls the windrower a rotative steering wheel would be more in conformance with the steering of the conventional tractor, combine and other vehicle. Thus, the operator would be controlling the windrower by a means similar to the tractor or combine. But unlike a tractor or combine, in which the wheels turn, the windrower is turned by changing the speed of the drive wheels. This conformity of the steering wheel control of the two hydrostatic units is complicated by the small arc required to shift the hydraulic pumps from full reverse to full speed forward and the preferred positioning of the steering control close to the front of the tractor. The opposite movement of the pintle arms on rotation of the single lever decreases the speed of one wheel while increases the speed of the other wheel. This makes the turning of the windrower very responsive to the lever. For greater compatibility with the steering of tractors, combines or the like, the steering wheel of the windrower should have a long arc of movement for turning the windrower.

OBJECTS AND SUMMARY OF THE INVENTION

It is therefore an object of this invention to provide a linkage mechanism between the steering wheel and the separate pumps of the two hydrostatic units that provides for a wide arc of movement of the steering wheel for movement of the pump controls.

A still further object of the inveniton is to provide a linkage mechanism that does not create too great a differential between the pump controls on turning the windrower and that reduces the forward speed on a sharp turn.

In summary, this invention comprises a self-propelled, hydrostatically driven agriculture machine having a steering mechanism with a steering wheel rotating a steering shaft and with links, respectively, coupled to the pintle arms of the hydrostatic units and to the steering shaft in such a manner that the steering wheel can move in a substantial arc for a given actuation of the pintle arms and that on turning of the steering shaft one pintle arm remains initially stationary while the other pintle arm reduces the speed of the respective hydrostatic unit and, on further turning of the steering shaft, the initially stationary pintle arm moves to reduce the speed of the other hydrostatic unit.

These and other and further objects of this invention will be apparent from the following specification and the appended claims taken in connection with the drawings which illustrate a preferred embodiment of the invention.

DETAILED DESCRIPTION OF THE PREFERRED EMBODIMENT

INTRODUCTION

In this description the right and left sides of the windrower are in relation to the forward direction A of the windrower. The fore-and-aft plane is a vertical plane extending in the forward direction and through the steering shaft.

Figure 1:
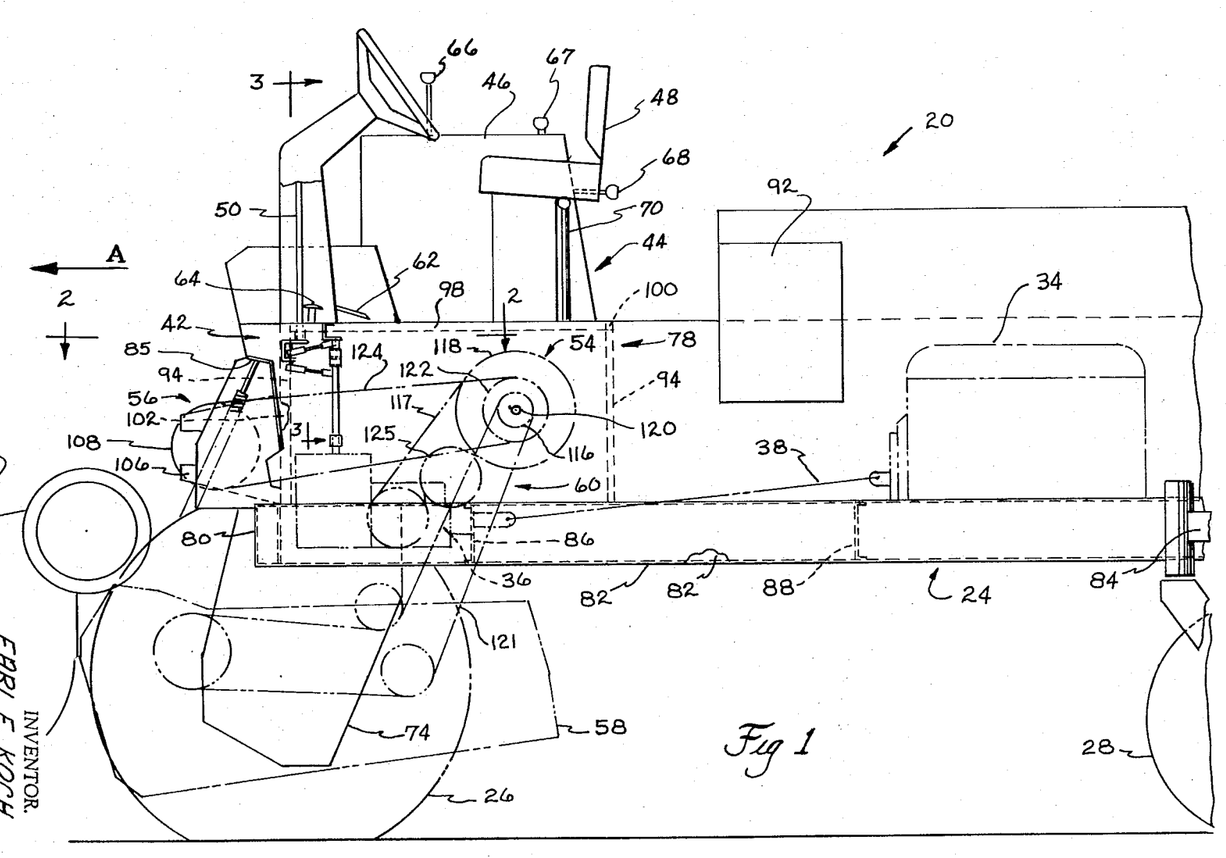
FIG. 1 is a side view of the windrower with the engine, propeller shaft, gear transmission, hydrostatic means, steering and speed mechanisms generally illustrated by dot-dash lines.

The windrower generally comprises a tractor 20 and a header 22 mounted on the front of the tractor perpendicular to the direction of travel. The tractor 20 has a main frame means 24 supported and driven in front by two large transversely spaced wheels 26 and supported in the rear by two trailing caster type wheels 28. The front wheels are driven by two hydrostatic units 30,32 connected by a gear transmission 36 and a propeller shaft 38 to the engine 34 at the rear of the tractor.

Figure 2:
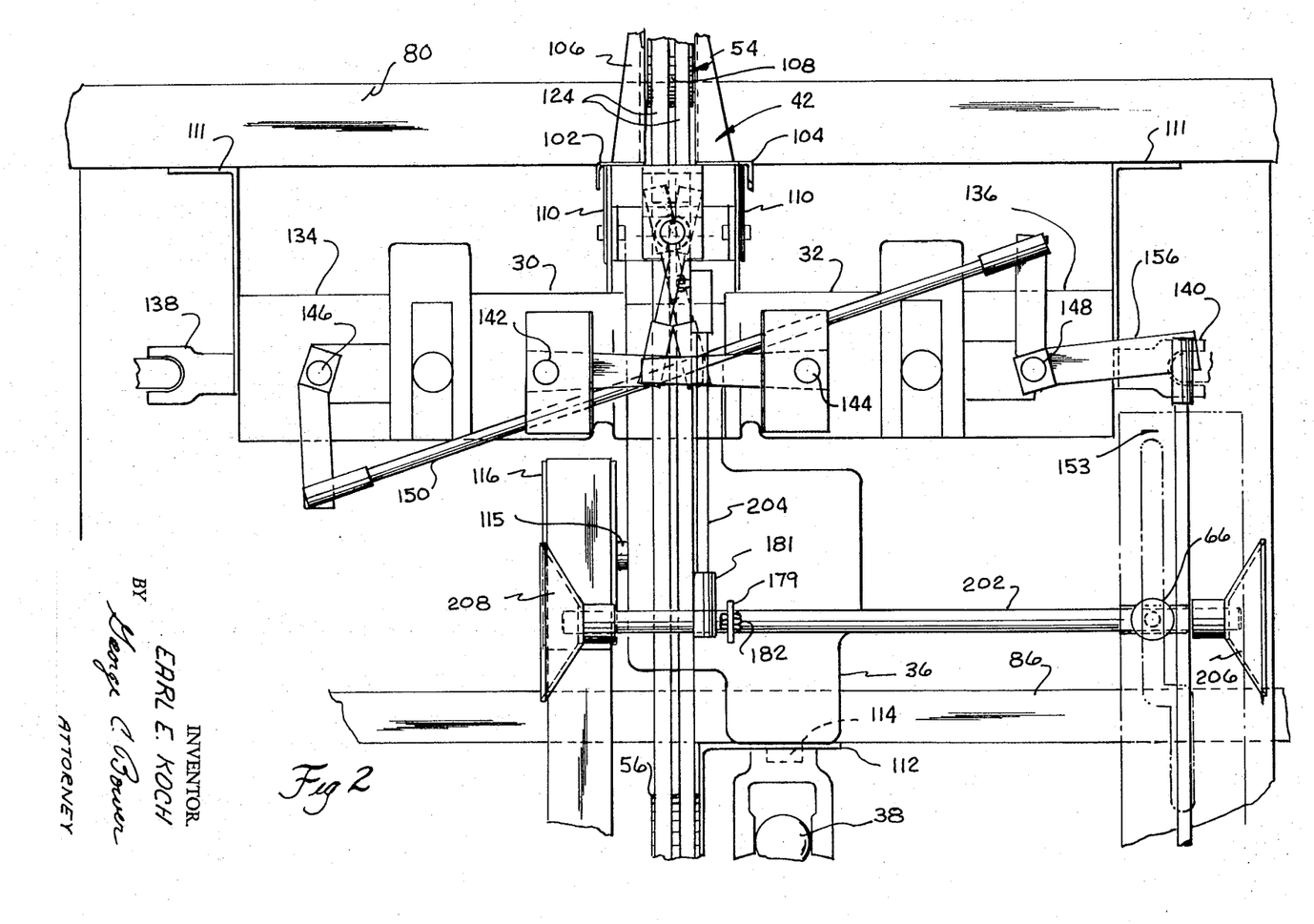
FIG. 2 is a top view of the gear transmission, hydrostatic units and speed and steering mechanisms taken from line 2—2 of FIG. 1.

The operation of the hydrostatic units 30,32 is controlled by the speed control mechanism 40 and the steering mechanism 42. The speed control mechanism extends above the operator's platform 44 of the frame means through the control console 46 which is to the right of the operator's seat 48. The steering mechanism extends through the steering post 50 and has a steering wheel 52 rotatably mounted on the vertically adjustable portion 50a of the post.

The header is pivotally suspended from the main frame means and has a semi-flotation, harvesting position and a raised transport position. The header has a sickle, reel and consolidating auger, all of which are not shown in the drawings. These components are operated from the gear transmission by belt and pulley drives 54,56.

The windrower also carries a conditioner 58 underneath the front of the tractor and immediately behind the header for conditioning the harvested crop received from the header. The conditioner is driven by a belt and pulley drive 60. In addition to the steering post 50 and the control console 46, the operator's platform 44 has a right pedal 62 for actuating the hydraulic valve, not shown, raising and lowering the header 22 and a left pedal 64 for applying the brakes. The console, in addition to the lever 66 of the speed control mechanism, has a control lever 67 for setting the hydrostatic units to a cutting speed range or an extended transport speed range. At the rear of the console is a throttle control 68 for setting the engine at an idle condition or a run condition. To the left rear of the operator's seat is the lever 70 operating the clutch coupling the header and conditioner drives to the gear transmission.

FRAME MEANS

The frame means 24 comprises a main frame 29, two casing means 74 extending downwardly from the frame 29 on opposite sides and an upper support frame 78 mounted on the forward portion of the frame. The frame 29 has a front beam 80, two longitudinally transversely spaced beams 82, and a rear beam, not shown. A beam 84 extending beyond the sides of the frame is pivotally mounted on the rear beam and has the rear caster wheels 28 pivotally mounted on the respective outer ends. Casings 74 house gears, not shown, which drive the respective wheels. The wheels 26 are rotatably mounted on the casings 74 and support the front end of the tractor. The casings are connected to the cross beam 80 and the respective supports of the frame means. The header is suspended from plates 85 extending upwardly from the cross beam 80 above the casings 74. Transverse intermediate beams 86,88 extend between the longitudinal beams 82 for stiffening the frame and as later explained herein assist in the support of the gear transmission and hydrostatic units.

The upper support frame 78 comprises four corner supports 94, front transverse beam 96, four rearwardly extending beams 98 and a rear transverse beam 100. At the mid-front, two vertical posts 102,104 are slightly spaced apart to support the drive to the header. Brackets 106 extend outwardly and forwardly to support the driven sheave 108 of the belt and pulley drive 56. The pulley 108 is coupled to the header drives, not shown, which operate the reel, sickle and consolidating auger.

The hydrostatic units 32,32 are fastened at the left and right ends by brackets 110 to the front transverse beam 80 and are attached to and supported by the gear tansmission 36 at the adjacent ends. The gear transmission is attached by brackets 111 to the beam 80. At the rear end, the gear transmission is attached by the bracket 112 to the cross beam 86. Thus, the hydrostatic units and gear transmission are firmly and rigidly attached to the frame means for transmission of power.

The oeprator's platform 44 is mounted on top of the supporting frame 78 with the speed control lever 66 extending therethrough and through the control console 46. As previously described, the steering shaft extends upward through the platform 44 and through the steering post 50.

DRIVE MEANS

The engine 34 provides the power to drive the header 22, two front drive wheels 26, the conditioner 58 and the hydraulic means raising and lowering the header. The drive means of the components on the header are connected to the engine by the belt and pulley drive 56, belt and pulley drive 54, gear transmission 36 and propeller shaft 38. The wheels 26 are separately connected and driven by the hydrostatic units 30,32. The conditioner is driven by the belt and pulley drive means 60 coupled to the belt and pulley drive 54.

Thus the distribution of the power from the engine is through the gear transmission 36 which extends fore-and-aft between the beams 80 and 86 and mid-way between the longitudinally extending beams 82. At the rear end, the gear transmission has a rearwardly extending input shaft 114 extending through an opening in the intermediate cross beam 86. The propeller shaft 38 is universally connected to the engine 34 and the input shaft 114. On the left forward portion of the gear transmission 36 is an output shaft 115 with a pulley 116 of the belt and pulley drive 54. The belt 117 of the drive extends rearwardly and upwardly at an angle to drive the pulley 118 mounted on and keyed to the transverse shaft 120. The shaft 120 is rotatably mounted in the support frame 78. Also keyed to the shaft 120 is the pulley 122 on the right side of the pulley 118. The pulley 122 is part of the belt and pulley drive 56 which has a belt 124 drivingly coupling the pulley 122 and the pulley 108 rotatably mounted on the brackets 106 adjacent the header. The belt or belts 117 of the belt and pulley drive 54 are loosely mounted on the pulleys 116 and 118. A pivotally mounted idler 125 actuated by the header control lever 60 presses the idler 125 against the belt 117 to tighten the belt so that shaft 120 is driven by the engine 34. In this manner the header components and the conditioner 58 are coupled to the engine 34.

The shaft 120 extends across the frame to the right side of the windrower and the support frame 78 for coupling with the belt and pulley drive 60 connected to the conditioner.

STEERING AND SPEED CONTROL MECHANISM

As previously explained, the wheels 26 are separately connected to the hydrostatic units 30,32. The casings of the hydrostatic pumps 30,32 are directly attached to the forward end fo the gear transmission. In these hydrostatic units, the motors 134, 136 are mounted on the pumps so that the transmission of the hydraulic fluid is within the casings and there are no exterior pipes connecting the pumps and motors. The respective pumps 134,136 are connected to the respective gear drives in the casings through the universal joints 138,140, respectively.

The pumps and motors, thus, transfer the power from the gear transmission to the respective wheels. The pumps have pintle arms 142,144 and the motors have pintle arms 146,148. The motor pintle arms have one position for setting the motor at a harvesting speed range and a second position for setting the motors at an extended transport speed range. These arms are interconnected by a rod 150 for positioning the arms simultaneously in one position or the other. The pintle arm 148 of the motor 136 is mounted on the vertical shaft 152 attached at the lower end to the pivotal control of the motor and at the upper end rotatably held by the bracket 154 which is fastened to a cross member of the supporting frame 78. The shaft 152 at the upper end has a radially extending arm 156 connected to the lever 68 by the link means 153 at the console for setting the motors in either harvesting or trasnport ranges.

Figure 9:
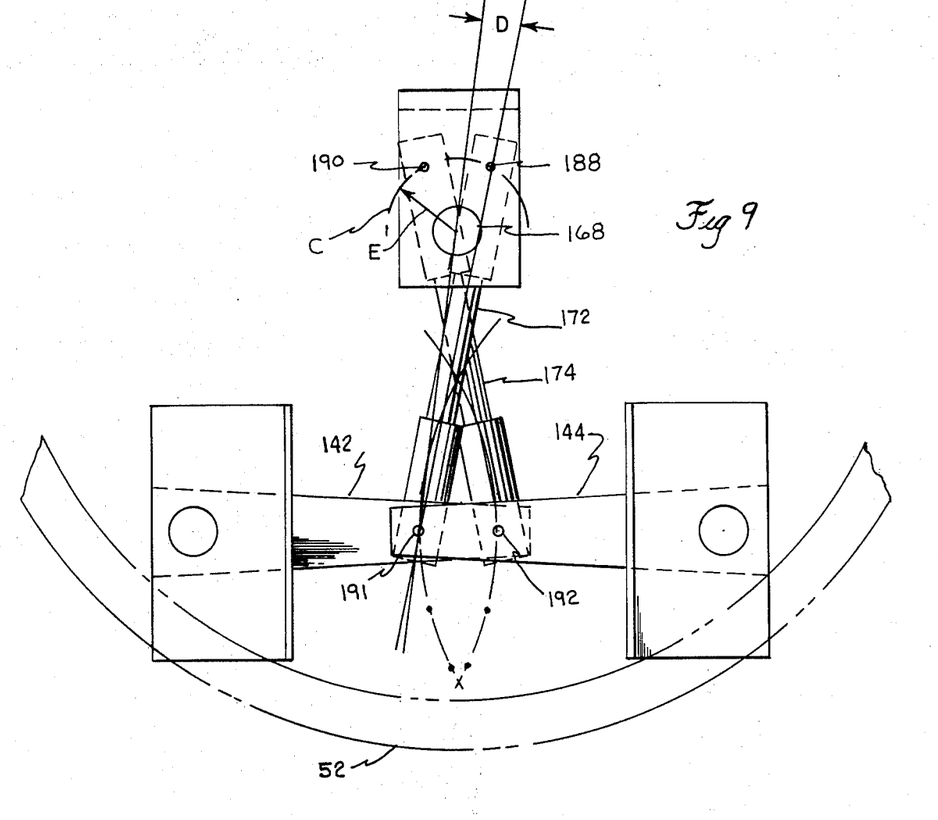
FIG. 9 is a top view of the pintle arms and links connected to the steering shaft.
Figure 10:
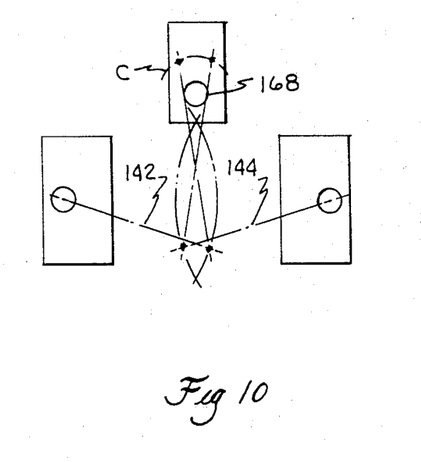
FIG. 10 is a diagrammatic view of the pintle arm and links in neutral.
Figure 11:
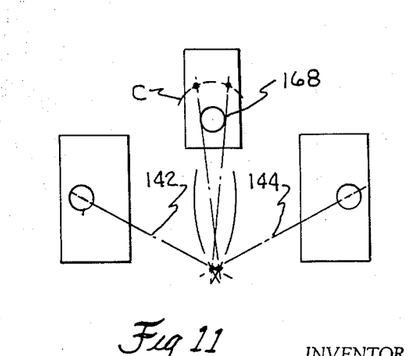
FIG. 11 is a diagrammatic view of the pintle arm and links in full reverse.

The pintle pump shafts 160,162 are connected at the bottom ends to the respective pump controls and at the upper ends rotatably mounted in the L-shaped brackets 164,166, respectively, which are respectively attached to the longitudinally extending upper intermediate beams 98 which are on opposite sides of the fore-and-aft plane. The pintle arms 142,144 are rigidly fastened to the upper end portions of the shaft 160,162 and extend radially toward one another. The ends of the pintle arms overlap and have end portions offset vertically to position the right pintle arm 144 over the left pintle arm 142. The pintle arms position the pump controls in the full forward speed when in line and parallel to the front of the windrower and in the neutral position when positioned at approximately seventeen and one-half degree angle to the rear of the forward position. The furtherest reverse position is approximately one-half the distance of the full forward position from neutral. These relations are best shown in FIGS. 9–11. It is of course understood that these positions of the pintle arms are when the windrower is set for moving straight forward. On turning, the pintle arms will assume other positions and relationships as later explained herein.

Figures 3, 5:
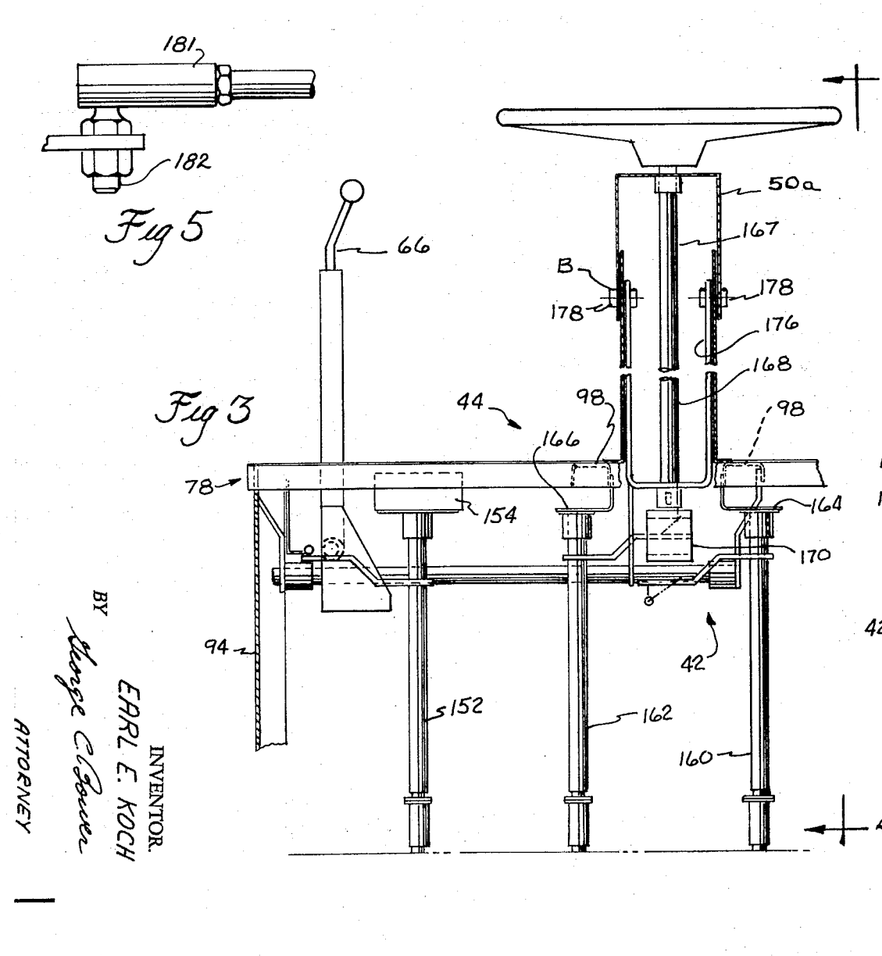
FIG. 3 is a front view of the speed and steering mechanisms taken from line 3—3 of FIG. 1.
FIG. 5 is an enlarged fragmentary view of the pivotal coupling of the speed mechanism to the steering mechanism.
Figure 4:
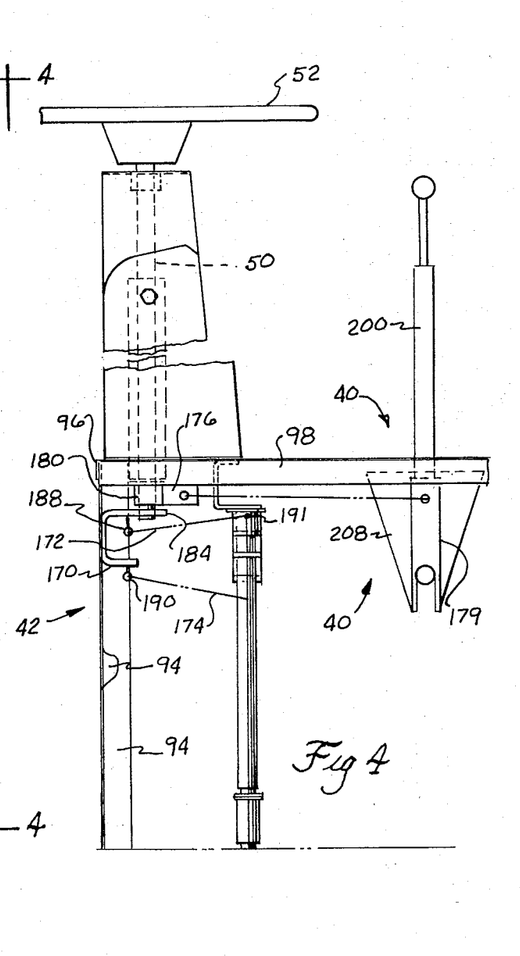
FIG. 4 is a side view of the speed and steering mechanisms taken from line 4—4 of FIG. 3.

The pintle arms are actuated by the turning of the steering wheel 52 which is connected to the pintle arms by the adjustable shaft 167, steering shaft 168, U-shaped bracket 170 and links 172,174. The adjustable steering wheel shaft 167 is rotatably mounted in the adjustable portion 50a and the steering shaft 168 is rotatably in the U-shaped support 176 which is pivotally mounted at the upper end to the steering post 50 by the fastening means 178. These fastening means also pivotally attach the adjustable portion 50a to the steering post 50.

The U-shaped support 176 extends downwardly to slightly below the operator's platform 44 to position the bearing 180 adjacent to the level of the pintle arms. The shaft 167 is connected to the steering shaft by the universal joint 182 at the line of pivot of the steering post and adjustable portion 50a.

The extended portion of the upper leg 184 of the bracket 170 is fixedly attached to the lower end of the shaft for rotation therewith. The lower leg 186 is positioned vertically in line with the upper leg. The ball pivots 188,190 are mounted on the respective legs and extend downwardly. The other ball pivot 188 is on the right side of the brackets and the lower ball pivot is on the left side the upper right ball pivot is connected by the link 172 to the upper right pintle arm by the ball pivot 191 which extends upwardly from the overlapping portion of the arm. The links 172 has sockets at each end rotatably fitting on the ends of the ball pivots. The ball pivots 188 and 191 are on opposite sides of the fore-and-aft plane when the bracket 170 is in the straight forward position. The lower link 174 connects the ball pivot 190 to the ball pivot 192 of the lower left pintle arm. The ball pivot 190 extends downwardly and on the other side of the fore-and-aft plane from the ball pivot 190 on the bracket. As seen from the FIGS. 9–11, these links cross between the bracket and the pintle arms 142,144 due to the length of the pintle arms and the links. The pintle arms extend across the fore-and-aft plane through the steering shaft 168.

Figures 6, 7, 8:
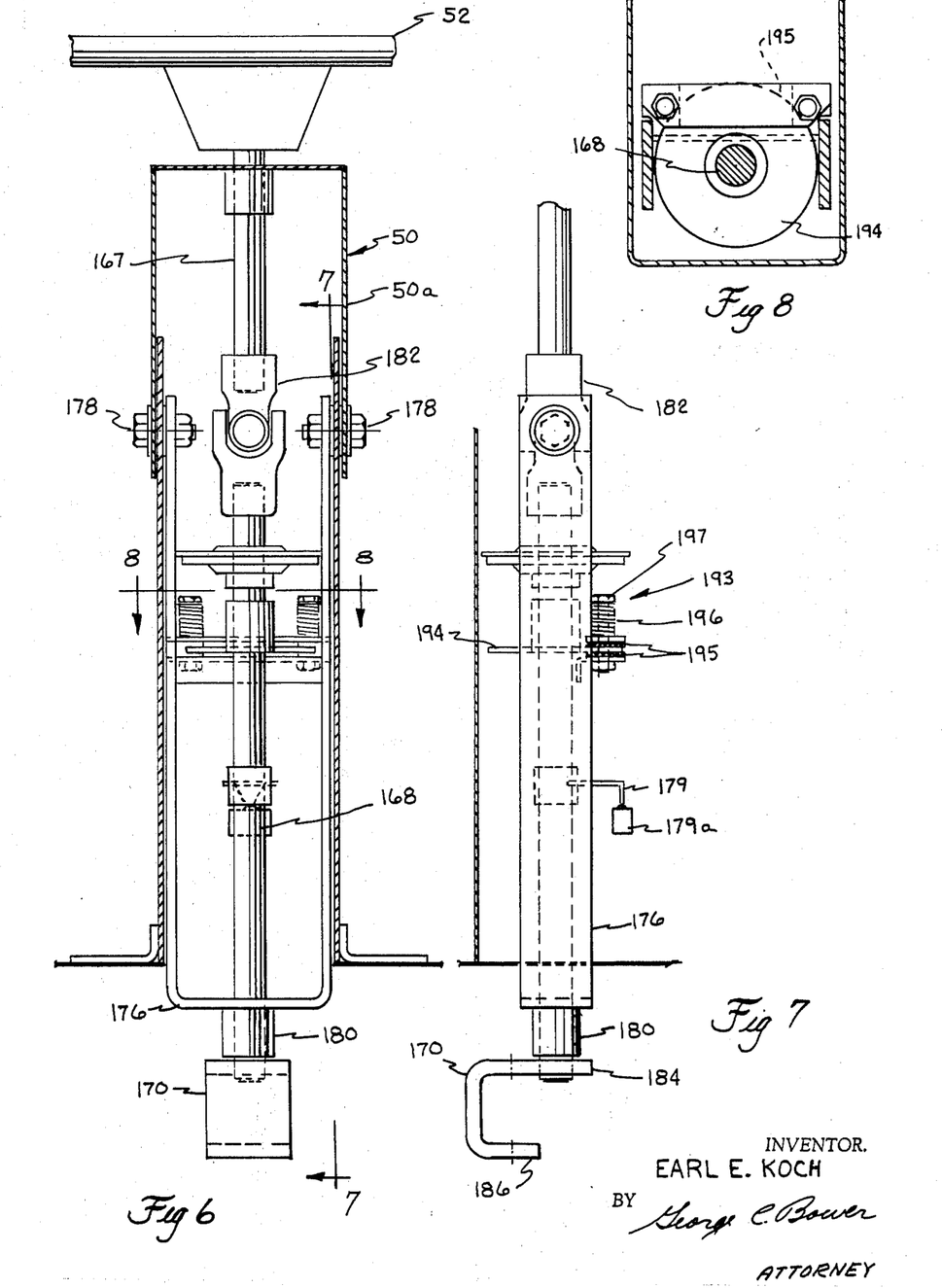
FIG. 6 is an enlarged front view of the steering post and a modified steering shaft with the post shown in section.
FIG. 7 is an enlarged side view of the steering post and the modified steering shaft of FIG. 6.
FIG. 8 is a sectional view of the steering post and steering shaft taken along line 8—8 of FIG. 6.

In FIGS. 6 and 7, a modification of the steering shaft 168 is shown in which a friction means 193 is mounted on the shaft and U-shaped support 176. A disc 194 is keyed to the shaft and fits between to friction linings 195 mounted on the support 176. The linings 195 are pressed together against the disc by springs 196. This provides a stiffness or resistance to turning of the shaft. Thus the pump pintle arms 142,144 can be precisely controlled by the operator. The pressure of the springs may be adjusted by the nut and bolt combination 197.

The speed control mechanism 40 generally comprises the control lever 66, horizontal shaft 202 and the connecting link 204. The horizontal shaft 202 is rotatably mounted in a socket 206 fixedly fastened to the side wall of the windrower along the right side of the supporting frame and at the left end is rotatably mounted in a socket on the strap 208 extending downwardly from the left longitudinal beam 98. The control lever 66 is secured to the shaft 202 by gusset plates 208. Thus on forward an rearward movement of the lever the shaft rotates. The link 204 is pivotally connected to the shaft 202 and universally connected to the fixed extension 179 from the bearing 180 by ball pivot 181 fitting in the socket 182. On rotation of the lever 66 the shaft 202 rotates actuating the link 204 forwardly or rearwardly depending upon the direction of rotation. The lever 204 swings the steering shaft 168 and the bracket 176 about the pivot axis B formed by the fastening means 178.

The steering shaft has a cam 179 engaging a switch 179a mounted on the post 50 to complete the ignition circuit only when the swinging steering shaft is in the neutral forward position.

OPERATION

As just described the link 204 is universally connected to the extension of the bearing 180 for setting the pintle arms over the range of forward and reverse speeds when the windrow is moving along a straight course or turning. The lever 66 is held at a given speed by engaging one of a series of spaced notches in a rack, not shown. The operator under normal harvesting conditions will set the windrower at a desired forward speed. The direction of the course of travel of the windrower or the turning of the windrower around at the end of a cut are accomplished by the steering mechanism through the wheel 52. The speed setting need not be changed.

The steering mechanism creates a differential in the speed of the wheels to turn the windrower either right or left when the windrower is traveling at any forward speed. The opertion of the steering mechanism is belt illustrated in FIGS. 9–11. The pintle arms 142,144 are in the full speed forward position and parallel to the front of the windrower. On rotation of the steering shaft 168, the ball pivots 188,190 turn through an arc C. When the speed lever is fully forward, the ball pivots are on opposite sides of the plane which passes through the center of the U-shaped bracket and the trailing links associated pintle arm pivotal connection, and the trailing pivot is spaced short distances D therefrom. The ball pivots 191,192 on the pintle arms are, in this embodiment, positioned immediately rearward of the bracket 170. The links 172 and 174 are crossed due to the overlapping of the end portions of the pintle arms. An important feature is that the length of the links 172 and 174 are in the order of the length of the pintle arms so that on turning of the bracket 170 the trailing pivot, in this instance pivot 188, travels the distance D to pass beyond said plane. The leading pivot 190 moves rearwardly in the arc C slowing the left wheel to turn the windrower. The ball pivot 188 does not substantially change the speed of the right wheel but on passing across the plane commences to slow the right wheel. Thus, the speed of the windrower is being slowed down by both wheels on turning of the windrower and the sharper the turning of the windrower, greater is the reduction in speed.

Another feature of the steering mechanism is the radius E of the arc of the ball pivots 188,190 about the axis of the steering shaft and the length of the arc. The bracket has a maximum arc to the right or left of about 100 degrees. The ball pivots will therefore swing rearwardly past the center of the shaft. However, on a full forward speed, this distance is less than the length of the arc of the pintle arms from the full speed forward to neutral. Neither pintle arm can be rotated by the steering wheel from the full speed forward position to reverse. This avoids any reversal in the direction of the windrower or an application of a severe reversing force when the windrower is traveling forward at full speed that may make the windrower difficult to handle. At lesser speeds the speed of a wheel may be reversed on turning of the steering wheel.

As illustrated in FIG. 9, neutral position is about seventeen and a half degrees from the full forward position and the reverse range is about eight degrees rearward off the neutral position.

The lengths of the links and pivot arms are such that the link and pintle arms combination never reaches dead center thus the links maintain an angle in the nature of a right angle with the respective pintle arm to either pivot about the pintle arm ball pivot or rotate the pintle arm. The spacing of the ball pivots 188,190 is to provide for the actuation of a pintle arm while the other arm remains substantially in one position over the initial portion of the arc C and to maintain this differential as the two ball pivots move rearwardly on the same side of the fore-and-aft plane.

Another feature of the steering mechanism is the universal joint connecting the tiltable shaft 167 and the steering shaft 168. When the adjustable post portion is tilted the universal joint is angled. This introduces a variation in the turning of the two shafts. The universal joint causes the steering shaft 168 to turn less than the shaft 167 when the joint is at an angle. This further contributes to the long movement of the steering wheel in relation to the movement of the pintle arms.

SUMMARY OF THE FEATURES AND ADVANTAGES OF THE INVENTION

It is seen from the foregoing description that a steering mechanism with a steering wheel has been provided at the front of the windrower in rather a short space due to the forward location of the hydrostatic units and steering post. The steering wheel has a substantial arc of movement for controlling the relative speeds of the wheels in turning the windrow to provide a smooth control of the windrower. This smoothness is primarily due to the links being connected to the steering shaft and having lengths in relation to the pintle arms to initially decreases the speed of one wheel without substantially changing the speed of the other wheel. On turning more sharply both of the wheels are differentially decreased in speed, thus, in addition to the convenient length of movement of the steering wheel, the windrower is slowed down for sharp turns contributing further to the smoothness of the operation of the windrower. The long arc of movement of the wheel for controlling the differential between the wheels makes it easier for the operator to correct the windrower as it is moving through the field. Directions of the windrower may be made without overcorrecting. This is further enhanced by providing a resistance to the turning of the steering shaft. The operator is then always working against a force in the adjustment of the pintle arms. This force can be readily set to the particular desires of the operator.

Another feature of the steering mechanism contributing to the smoothness of the steering control is the amount the shaft can rotate the pintle arms at full speed. This amount is less than the distance of the pintle arms from full speed to reverse. Thus, it is not possible to be moving forward at full speed and in sharp turning of the vehicle apply a reverse drive to one of the wheels which may cause some roughness in operation. At the lower speeds a wheel may be reversed but since the vehicle is moving at a slow speed this reversal will not affect the smoothness of the operation of the windrower.

While the invention has been described, it will be understood that it is capable of further modifications and this application is intended to cover any variations, uses, or adaptations of the invention following in general, the principles of the invention and including such departures from the present disclosure as come within known or customary practice in the art to which the invention pertains, and as may be applied to the essential features hereandbefore set forth and as fall within the scope of the invention or the limits of the appended claims.

Having thus described my invention, what I claim is:

1. A self-propelled agricultural machine comprising a mobile frame mounted on a pair of spaced drive wheels, a header suspended on said frame and extending across said machine in front of said frame and spaced wheels, a control platform on siad frame between said wheels and immediately behind said header, two hydrostatic motors drivingly connected to said respective wheels and two axial aligned and spaced pumps extending between said wheels and underneath said control platform, said pumps being hydraulically connected to said respective motors, a power source on said frame drivingly connected to said spaced pumps, said pumps having pintle arms pivotally mounted thereon and extending toward one another in overlapping relation with one arm above the other, a steering shaft extending through said control platform and having a U-shaped control member mounted on the lower end of said steering shaft underneath said control platform, said U-shaped control member having an upper and lower leg extending toward said pintle arm, means pivotally mounting said shaft above said platform to swing about a horizontal axis and rotatably mounted to turn about a vertical axis in a fore-and-aft plane, said legs having, respectively, downwardly extending ball pivots on opposite sides of the fore-and-aft planes when the rod is in the straight forward position and moving in the same circular path on rotation of said steering shaft, said pintle arms extending, respectively, across the fore-and-aft planes and having ball pivots, respectively, on the opposite sides of and equal distances from the fore-and-aft plane and said pumps pivotally supporting said respective arms, two links extending across one another, one link being connected to said ball pivot on the lower leg and to said ball pivot on the lower arm on the opposite side of the fore-and-aft plane from said ball pivot on said lower leg, the other link connected to said ball pivot on the upper leg to said ball pivot on the upper arm on the opposite side of the fore-and-aft plane from said ball pivot on said upper arm, a steering wheel coupled to said steering shaft for turning said shaft, said links and arms having relative lengths that on rotation of said steering shaft by said steering wheel said ball pivots on said U-shaped control member are on the same side of the fore-and-aft plane and move said pintle arms in the rearward direction for differentially decreasing the speed of the wheels on the turning of the machine.

2. A self-propelled agricultural machine comprising a mobile frame mounted on a pair of spaced drive wheels, a control platform on said frame, two hydrostatic motors drivingly connected to said respective wheels and two axially aligned and spaced pumps, said pumps being hydraulically connected to said respective motors, a power source on said frame drivingly connected thereto, said pumps having pintle arms pivotally mounted thereon and extending toward one another, a steering shaft having a steering wheel coupled to said shaft above said platform and having a control member, said control member having two pivotal means and said pintle arms each having pivotal means, link means for connecting the control member pivotal means with said respective pintle arm pivotal means for actuation of said arms on rotation of said steering shafts, means pivotally mounting said shaft above said platform to swing about a horizontal axis and rotatably mounted to turn about a vertical axis means for independently moving said control member over a range of forward and reverse speeds, a steering wheel coupled to said steering shaft above said platform for rotating said shaft and pivotal means of the control member over an arc which passes through either side of planes which pass through the center of the pivotal connections of the control member, and the respective pintle arm pivotal connections of each link means, said trailing link initially moving at an angle in the nature of a right angle to the plane which passes through the center of the control member and the links associated pintle arm pivotal connection over range of speeds and arcs of turning of said steering shafts so the pivotal means of said control member initially maintains the speed of its associated wheel but which is capable of turning to the other side of said plane upon further turning of the steering shaft thereby moving the trailing pivotal means rearwardly to follow the leading pivotal means which differentially decreases the speed of the associated wheel.

3. A self-propelled agricultural machine comprising a mobile frame mounted on a pair of spaced drive wheels, a control platform on said frame, two hydrostatic motors drivingly connected to said respective wheels and two axially aligned and spaced pumps, said pumps being hydraulically connected to said respective motors, a power source on said frame drivingly connected to said spaced pumps, said pumps having pintle arms pivotally mounted thereon, a steering shaft having a steering wheel coupled to said shaft and having a control member said member having two pivotal means and said pintle arms each having pivotal means, link means for connecting the control member pivotal means with the pintle arms pivotal means for actuation of said arms on rotation of said steering shafts, said control member pivotal means turning in an arc with the leading pivotal means initially reducing the speed of the associated wheel and the trailing pivotal means initially maintaining the speed of associated wheel and on further turning said leading and trailing pivotal means differentially reducing the speed of both wheels.

4. A self-propelled agricultural machine as set forth in claim 3 wherein said steering shaft has a tiltable portion and a universal joint connecting said shaft and portion so that on said shaft and portion being at an angle to one another said tiltable portion rotates through a greater angle from the straight forward position than said steering shaft.

5. A self-propelled agricultural machine as set forth in claim 3 wherein said steering shaft has means resisting rotation in either direction, of said shaft.

6. A self-propelled agriculture vehicle as set forth in claim 3 wherein said trailing links respectively, directly and pivotally connected to said pintle arm moves at a right angle to the plane which passes through the center of the control member and the links associated pintle arm pivotal connection.

7. A self-propelled agricultural machine as set forth in claim 3 wherein said pintle arms extend towards one another in overlapping relation to extend across a fore-and-aft plane through said steering shaft with said pivotal means of said pintle arms being on the portion extending through said plane and said control member pivotal means being on opposite sides of the fore-and-aft plane and said links being, respectively, connected to said pivotal means on opposite sides of the fore-and-aft plane in the straight forward speed position.

8. A self-propelled agricultural machine as set forth in claim 7 wherein
said control member is U-shape and has upper and lower legs with said respective pivotal means mounted on said legs, respectively, and on opposite sides of a fore-and-aft plane through said steering shaft.

* * * * *